United States Patent [19]

Otawa et al.

[11] Patent Number: 4,818,785
[45] Date of Patent: Apr. 4, 1989

[54] FINE PARTICULATE CROSSLINKED AMORPHOUS COPOLYMER AND PREPARATION AND USE THEREOF

[75] Inventors: Yasuhiko Otawa; Tetsuo Tojo; Akira Matsuda, all of Ichihara; Katsuo Okamoto, Funabashi, all of Japan

[73] Assignee: Mitsui Petrochemical Industries, Ltd., Tokyo, Japan

[21] Appl. No.: 948,362

[22] PCT Filed: Apr. 16, 1986

[86] PCT No.: PCT/JP86/00192

§ 371 Date: Dec. 9, 1986

§ 102(e) Date: Dec. 9, 1986

[87] PCT Pub. No.: WO86/06086

PCT Pub. Date: Oct. 23, 1986

[30] Foreign Application Priority Data

| Apr. 16, 1985 [JP] | Japan | 60-79231 |
| Jul. 18, 1985 [JP] | Japan | 60-157047 |
| Aug. 26, 1985 [JP] | Japan | 60-185919 |
| Feb. 28, 1986 [JP] | Japan | 61-41954 |

[51] Int. Cl.$^4$ .................... C08F 8/00; C08F 6/14; C08F 255/04; C08F 255/06
[52] U.S. Cl. .................... 524/576; 524/536; 525/304; 525/387; 525/240; 525/177; 525/193; 525/194; 525/319; 525/211
[58] Field of Search .................... 525/387, 331.7; 524/576

[56] References Cited

U.S. PATENT DOCUMENTS

| 2,802,891 | 8/1957 | Field et al. | 525/387 |
| 2,975,151 | 3/1961 | Ropp | 525/387 |
| 4,006,283 | 2/1977 | MacKenzie | 525/331.7 |
| 4,101,505 | 7/1978 | Cooper et al. | 524/411 |
| 4,140,732 | 2/1979 | Schnetger et al. | 525/194 |
| 4,243,773 | 1/1981 | Arnaud et al. | 525/387 |

FOREIGN PATENT DOCUMENTS

| 1140294 | 3/1980 | Canada . | |
| 47-030751 | 11/1972 | Japan . | |
| 50-113549 | 9/1975 | Japan | 525/387 |
| 52-121654 | 10/1977 | Japan . | |
| 55-130746 | 10/1980 | Japan | 525/387 |
| 61-12711 | 1/1986 | Japan . | |
| 912735 | 3/1982 | U.S.S.R. | 525/387 |

Primary Examiner—Carman J. Seccuro
Attorney, Agent, or Firm—Armstrong, Nikaido, Marmelstein & Kubovcik

[57] ABSTRACT

A fine particulate crosslinked amorphous copolymer comprising an amorphous copolymer having a constituent unit originating at least from ethylene and α-olefin, and having an average particle diameter of 0.2 to 50 μm and a hot toluene insolubles content of 15% by weight or more.

5 Claims, No Drawings

FINE PARTICULATE CROSSLINKED AMORPHOUS COPOLYMER AND PREPARATION AND USE THEREOF

TECHNICAL FIELD

This invention relates to a fine particulate crosslinked amorphous copolymer, and the preparation and use thereof. More particularly, it relates to a fine particulate crosslinked amorphous ethylene/α-olefin copolymer or amorphous ethylene/α-olefin/polyene copolymer having a superior performance as a modifier of rubber or plastics, and a process for preparing the same. This invention further relates to a polymer composition comprising the above-mentioned fine particulate crosslinked amorphous ethylene/α-olefin copolymer, and a crosslinked amorphous latex composition suitable for preparing a thermoplastic resin having an excellent weathering resistance, impact resistance and surface gloss.

BACKGROUND ART

As particulate rubbers, SBR, NBR, CR and EPDM are commercially available. These are made particulate mainly for continuously mixing rubber and a variety of compounding agents when vulcanized rubbers are produced, and have a particle diameter as large as about 0.4 mm to about 4 mm. However, in the field of modifiers for rubber or plastics, as well as fillers, additives for ink or cosmetics, etc., a fine particulate rubber compounding agent has been sought after from a viewpoint of rubberyness, lightweight properties, and so on.

Studies for fining the particle size have been made in respect of EPDM. For example, U.S. Pat. No. 4,294,744 reports such fine EPDM, but the particle diameter thereof ranges from 500 to 3000 $\mu m$, which lies outside the territory of a fine particulate rubber.

Thus, to the knowledge of the present inventors, a fine particulate amorphous copolymer which has fine particulates, and wherein crosslinkages are formed in the particles, is not known.

On the other hand, thermoplastic elastomers are used as energy saving or resource saving type elastomers, in particular, as substitutes for vulcanized rubbers, for automobile parts (such as bellows, tubes, interior sheets and mudguards), industrial machine parts (such as pressure hoses, gaskets and diaphragms), electronic or electric equipment parts, construction materials, etc. For example, olefin series thermoplastic elastomer compositions comprising a blend of completely crosslinked ethylene/propylene/non-conjugated diene copolymer rubber (EPDM) and polyolefin are known in the art as disclosed in Japanese Examined Patent Publications (Kokoku) Nos. 46138/1983, 18448/1980, etc. These compositions have excellent properties, but are limited as a substitute for vulcanized rubber because of a lack of rubberyness and moldability, an improvement of which is required.

Also, polyesters mainly comprised of polyethylene terephthalate and polybutylene terephthalate have an excellent high elasticity, low creep, low water absorption, chemical resistance, high softening point, high electric insulation, etc., and are therefore widely used as fibers or films, as well as engineering plastics for machine parts or electric parts. But although the polyesters of this sort have the excellent properties as mentioned above, they do not have a sufficiently high impact resistance, such as the notched Izod impact strength, and are disadvantageous in that they are not suitable for molded parts requiring high impact resistance. Accordingly, efforts have been made to improve the impact resistance without impairing the above-mentioned excellent properties inherent to polyesters.

As attempts to improve the impact resistance of polyesters, there have been reported a process in which butyl rubber is mixed into polyester (see Japanese Patent Publication No. 5224/1970) and a process in which ethylene/propylene rubber is mixed into polyester (see Japanese Patent Publication No. 5225/1971). Both of these, although showing an improved impact resistance, have a drawback in that the improvement is small, or the modulus is lowered.

Several attempts have been made to obtain thermoplastic resins having excellent weathering resistance, impact resistance, surface gloss and so on by graft polymerization of an α-olefin copolymer rubber or an ethylene/α-olefin/polyene copolymer rubber with an alkenyl aromatic compound and a vinyl monomer copolymerizable therewith. For instance, Japanese Patent Publication (Kokoku) No. 16394/1968 discloses a process in which the above rubber components kept in the state of a latex are allowed to gel in the presence of a crosslinking monomer such as divinylbenzene, followed by graft copolymerization to obtain a thermoplastic resin, and Japanese Patent Publication (Kokoku) No. 35718/1973 discloses a process in which the above rubber particles in a latex are swollen with a liquid aliphatic hydrocarbon or alicyclic hydrocarbon, followed by graft copolymerization as they are.

However, none of the processes in the known prior arts have obtained a thermoplastic graft copolymer resin having a weathering resistance, impact resistance, surface gloss, etc. reaching levels satisfactory for practical use.

OBJECT OF THE INVENTION

An object of this invention is to provide a fine particulate crosslinked amorphous copolymer and a process for preparing the same.

Another object of this invention is to provide a fine particulate crosslinked amorphous copolymer particularly useful as a modifier of rubber, plastics and the like, and a process for preparing the same.

Still another object of this invention is to provide a thermoplastic elastomer having remarkably improved moldability and rubberyness without impairing the mechanical properties such as the excellent thermal resistance, weathering resistance and strength inherent to olefinic thermoplastic elastomers, and a process for preparing the same.

Still another object of this invention is to provide a polyester composition having excellent combined properties of impact resistance and high elasticity.

Still another object of this invention is to provide a crosslinked latex composition particularly useful for producing thermoplastic graft copolymer resins having excellent properties such as weathering resistance, impact resistance and surface gloss.

Still another object of this invention is to provide a crosslinked latex composition comprising as a base polymer an amorphous ethylene/α-olefin copolymer or an amorphous ethylene/α-olefin/polyene copolymer having good storage stability by itself.

SUMMARY OF THE INVENTION

According to this invention, there is provided a fine particulate crosslinked amorphous copolymer comprising an amorphous copolymer having constituent units derived from at least ethylene and α-olefin, having an average particle diameter of 0.2 to 50 μm, and containing 15% by weight or more of hot toluene insolubles (namely, 15% by weight or more of cross-linkages as hot toluene insolubles are formed in the particles).

According to this invention, there is also provided a process for preparing a fine particulate crosslinked amorphous copolymer having an average particle diameter of 0.2 to 50 μm, comprising homogeneously dispersing an amorphous ethylene/α-olefin copolymer or an amorphous ethylene/α-olefin/polyene copolymer having an intrinsic viscosity in a solution of decahydronaphthalene at 135° C. of 0.5 to 3.0 dl/g, in an aqueous medium in the presence of a surfactant to form a latex in which said amorphous copolymer has been dispersed in the form of fine particles, and crosslinking the copolymer in the latex state in such a manner that the content of hot toluene insolubles in the amorphous copolymer component may be in the range of 15% by weight or more, followed by separation and drying of the resultant crosslinked amorphous copolymer from the aqueous medium.

According to this invention, there is further provided a polymer composition containing an amorphous ethylene/α-olefin copolymer (A) and a resin (B) in weight ratio of;

A:B=90:10 to 1:99, wherein said amorphous ethylene/α-olefin copolymer (A) has the content of hot toluene insolubles in the range of 30 to 95% by weight, and is dispersed in said composition in the form of fine particles having an average particle diameter of 0.2 to 50 μm. When such a polymer composition contains a component (B) comprising, for example, a resin such as a crystalline polyolefin resin to have the compounding ratio of the component (A) to the component (B) being A:B=90:10 to 50:50 in weight ratio, and has an average particle diameter of the particles in the composition preferably in the range of 0.2 to 10 μm and a maximum particle diameter of 20 μm or less, there can be obtained a thermoplastic elastomer composition having excellent moldability, high strength, and high rubberyness.

Alternatively, when the component (B) comprises, for example, a resin such as a crystalline polyolefin resin and a linear polyalkylene terephthalate, and the compounding ratio of the component (A) to the component (B) is A/B=50/50 or more to 1/99, preferably 33/67 to 1/99, particularly preferably 25/75 to 2/98 in weight ratio, there can be obtained an impact resistant polymer composition having excellent impact resistance and moldability and high elasticity. Where the resin (B) is a linear alkyleneterephthalate, the average particle diameter of the component (A) in the composition is preferably 0.2 to 10, more preferably 0.3 to 5 μm in the light of the impact resistance and the elasticity.

According to this invention, there is further provided a crosslinked latex composition containing as a polymer component an amorphous ethylene/α-olefin copolymer or an amorphous ethylene/α-olefin/polyene copolymer and having the formation of crosslinkages, wherein the crosslinked amorphous copolymer latex composition has an average particle diameter of solids of 0.2 to 50 μm and the content of hot toluene insolubles in said polymer component is 30 to 95% by weight.

BEST MODE FOR CARRYING OUT THE INVENTION

Amorphous copolymer (A)

The amophous copolymer according to this invention (hereinafter referred to also as "copolymerized rubber (A)") may include an amorphous ethylene/α-olefin copolymer or an amorphous ethylene/α-olefin/polyene copolymer.

First, in the present specification, the amorphous ethylene/α-olefin copolymerized rubber is meant to include not only those which are completely amorphous, typified by the so-called rubber, but also polymers having a low crystallinity of 30% or less, preferably 15% or less, when the crystallinity is measured by an X-ray diffractometry.

The amorphous ethylene/α-olefin copolymerized rubber used in this invention is a copolymer of ethylene with α-olefin, for example, one or more of α-olefins having 3 to 10 carbon atoms such as propylene, 1-butene, 1-pentene, 1-hexene, 4-methyl-1-pentene, 1-octene and 1-decene.

The ethylene content is usually 50 to 92 mole %, preferably 50 to 87 mole %, and more preferably 63 to 82 mole %, and those having an intrinsic viscosity in a solution of decahydronaphthalene at 135° C. in the range of from 0.5 to 3.0 dl/g, particularly, from 0.7 to 1.5 dl/g are preferably used.

This ethylene/α-olefin copolymerized rubber may further contain one or more of polyene components. Specifically, such polyene components may be typically exemplified by chain nonconjugated dienes such as 1,4-hexadiene, 1,6-octadiene, 2-methyl-1,5-hexadiene, 6-methyl-1,5-heptadiene and 7-methyl-1,6-octadiene; cyclic nonconjugated dienes such as cyclohexadiene, dicyclopentadiene, methyltetrahydroindene, 5-vinyl-2-norbornene, 5-ethylidene-2-norbornene, 5-methylene-2-norbornene, 5-isopropylidene-2-norbornene and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Preferred polyenes are cyclic nonconjugated dienes and 4-hexadiene, in particular, dicyclopentadiene or 5-ethylidene-2-norbornene. These polyene components are copolymerized so as to have an iodine value of 30 at the maximum, preferably 20 or less, in a formed copolymer.

Such an ethylene/α-olefin copolymerized rubber as mentioned above may be prepared by a known process, as described, for example, in a publication of synthetic rubber processing techniques, "Ethylene/propylene rubber" (Taiseisha, Ltd.).

Namely, the copolymer is prepared by using in a medium a Ziegler catalyst comprising a soluble vanadium compound and an organic aluminum compound or the like, and feeding ethylene, an α-olefin having 3 to 10 carbon atoms, a polyene if necessary, and further a hydrogen gas as a molecular weight modifier. The medium may include, for example, aliphatic hydrocarbons such as pentane, hexane, heptane, octane and kerosene; alicyclic hydrocarbons such as cyclohexane; aromatic hydrocarbons sch as benzene, toluene and xylene; and halogenated hydrocarbons such as chlorobenzene, carbon tetrachloride, tetrachloroethylene, trichloroethylene, ethyl chloride, methylene chloride and dichloroethane, which can be used alone or in combination. The soluble vanadium compound may include, for example, vanadium tetrachloride, vanadyl trichloride (VOCl$_3$), vanadium triacetylacetonate, vanadyl acetylacetonate, a vanadyl trialkoxide VO(OR)$_3$ (wherein R represents an aliphatic hydrocarbon group), a halogenated vanadyl trialkoxide VO(OR)$_n$X$_{3-n}$ (wherein R represents an aliphatic hydrocarbon group, X represents a halogen atom, and $0<n<3$), which can be used alone or in combination of two or more. On the other hand, the organic aluminum compound may include a compound represented by the general formula: R$_m$AlX$_{3-m}$ (wherein R represents an aliphatic hydrocarbon group, X represents a halogen atom, and $1 \leq m \leq 3$), for example, triethylaluminum, diethylaluminum chloride, ethylaluminum sesquichloride, ethylaluminum dichloride, etc., which can be used alone or in combination of two or more.

Of the copolymers constituted as above, the amorphous copolymer used in this invention preferably includes those having an intrinsic viscosity in a solution of decahydronaphthalene at 135° C. in the range of from 0.5 to 3.0 dl/g, particularly from 0.7 to 2.5 dl/g. In other words, the molecular weight of the amorphous copolymer to be used affects the controlling of the particle diameter when preparing the fine particulate crosslinked amorphous copolymer, or the performance as a modifier of rubber or plastic of the resultant fine particulate crosslinked amorphous copolymer. For example, the above intrinsic viscosity of less than 0.5 dl/g may result in an 0.2 μm or less average particle diameter of the resultant fine particulate crosslinked amorphous copolymer, and thus sufficient improvement could not be obtained even if the resultant fine particulate crosslinked amorphous copolymer is used as an improver for the impact strength of a resin. On the other hand, the intrinsic viscosity exceeding 3.0 dl/g may result in difficulty in controlling the diameter of the rubber particles in the latex tate to 50 μm or less, to make it very difficult to prepare a fine particulate crosslinked amorphous copolymer having a particle diameter of 50 μm or less.

Preparation of fine particulate crosslinked amorphous copolymer

The fine particulate crosslinked amorphous copolymer of this invention can be prepared by homogeneously dispersing in an aqueous medium (a) the above-mentioned amorphous copolymer having an intrinsic viscosity in a solution of decahydronaphthalene at 135° C. in the range of from 0.5 to 3.0 dl/g, particularly from 0.7 to 2.5 dl/g, and, if necessary, (b) a crystalline low molecular α-olefin copolymer and/or a modified polymer thereof to form a latex in which said amorphous copolymer has been dispersed in the form of fine particles, and crosslinking the copolymer in the latex state in such a manner that the content of hot toluene insolubles in the polymer may become 15% by weight or more, preferably 30 to 95% by weight, followed by separation and drying of the amorphous copolymer from the aqueous medium. For the emulsification in water, known means and methods may be used, for example, a homomixer equipped with a high speed agitating blade or a high speed pipe emulsifier.

When the intrinsic viscosity of the amorphous copolymer used is outside the above range, adverse effects may be caused as mentioned above, in respect of the controlling of the particle diameter or the properties of the resultant fine particulate crosslinked amorphous copolymer.

The crystalline low molecular copolymer and the modified copolymer thereof that are very useful for controlling the particle diameter in the latex may exhibit effects of not only readily making finer the amorphous copolymer particles when the polymer is formed into a latex, but also preventing the enlargement of rubber particles by agglomeration at the crosslinking stage.

Such copolymer may include α-olefin copolymers, and any of those which are in a waxy state or a liquid state at a room temperature may be used. It is also possible to use both in combination.

As the waxy copolymer, there may be generally used an ethylene/propylene copolymer and/or an ethylene/1-butene copolymer. The copolymer useful for meeting the objects of this invention may include those having a density of 0.90 g/cm$^3$ or more and a Vicat softening point of 90° C. or more, preferably 95° C. or more.

Useful as the liquid copolymer are those having a intrinsic viscosity in the state of a solution of decahydronaphthalene at 135° C., of 0.01 to 0.3 dl/g. These waxy or liquid copolymers can be used as modified products containing as a graft copolymerization component an unsaturated carboxylic acid type compound mentioned hereinafter.

As the modified copolymer, there may be used a modified polyethylene wax subjected to graft modification by an unsaturated carboxylic acid type compound, and a modified ethylene/α-olefin copolymer. The unsaturated carboxylic acid type compound used as a modifier may include at least one selected from the group consisting of unsaturated carboxylic acids having 3 to 10 carbon atoms, and anhydrides thereof, amides thereof, imides thereof and esters thereof, including, for example, unsaturated carboxylic acids such as acrylic acid, methacrylic acid, maleic acid, fumaric acid, itaconic acid, citraconic acid, norbornene dicarboxylic acid, tetrahydrophthalic acid and bicyclo[2,2,1]hept-2-ene-5,6-dicarboxylic acid; unsaturated carboxylic anhydrides such as maleic anhydride, itaconic anhydride, citraconic anhydride, tetrahydro- phthalic anhydride, bicyclo [2,2,1]hept-2-ene-5,6-dicarboxylic anhydride; amides or imides such as maleic acid monoamide, maleic acid diamide and maleimide; and unsaturated carboxylates such as methyl acrylate, methyl methacrylate, dimethyl maleate, monomethyl maleate, diethyl maleate, diethyl fumarate, dimethyl itaconate, diethyl citraconate, dimethyl tetrahydrophthalic anhydride and dimethyl bicyclo[2,2,1]hept-2-ene-5,6-dicarboxylate. Of these, most preferred are maleic anhydride, maleic acid monoamide, maleic acid diamide, maleimide, monomethyl maleate, diethyl maleate, glycidyl acrylate or methacrylate, etc.

Modification may be carried out so that the content of such a graft copolymer component may be 0.2 to 50%, preferably 0.2 to 20%, based on the weight of the modified copolymer. A content of not more than 20% causes little change in the softening point of the modified copolymer.

When a modified ethylene/α-olefin random copolymer is used as the modified copolymer, preferably the modified copolymer has an intrinsic viscosity of 0.01 to 0.3 dl/g in a solution of decahydronaphthalene at 135° C.

Such a low molecular α-olefin copolymer or modified low molecular α-olefin copolymer may be used alone or in combination, and in either case, they are preferably contained in the latex in the range of from 2 to 50 parts by weight, particularly from 5 to 40 parts by weight, based on 100 parts by weight of the above-mentioned amorphous copolymer components. Use in an amount less than the above range may make formation of the polymer into fine particles difficult when the copolymer components are formed into a latex.

The copolymer can be homogeneously dispersed in an aqueous medium by, for example, dissolving the copolymer in a solvent such as n-hexane, and thereafter carrying out dispersion by stir-mixing the resultant solution into an aqueous medium in which an adequate amount of a surfactant has been dispersed, followed by heating to a suitable temperature to remove the solvent component by distillation. When a solvent is not used, the amorphous copolymer, etc. and the aqueous medium containing a surfactant may be kneaded by an extruder or the like, thereby forming a latex.

As the surfactant, there may be used any of an anionic surfactant, a cationic surfactant and a nonionic surfactant, but preferably an anionic surfactant such as a fatty acid sodium salt and a fatty acid potassium salt is used. The amount of the surfactant used may vary depending on the kind and type of the polymer component to be used, but preferably is selected in the proportion in general of 0.2 to 20 parts by weight based on 100 parts by weight of the amorphous copolymer.

As for the amount of the aqueous medium used, it is preferably selected so that the concentration of solids in the latex may be 5 to 65% by weight from a viewpoint of the controlling the particle diameter of the fine particulate crosslinked amorphous copolymer.

In this invention, it is essential to carry out the crosslinking in the latex state in order to prevent enlargement of the particle diameter because of the agglomeration of the fine particulate crosslinked amorphous copolymer during the course of removing the aqueous medium, and it is also necessary for the copolymer to be crosslinked so that the content of hot toluene insolubles in the amorphous copolymer component may be in the range of 15% by weight or more, preferably 30 to 95% by weight, and most preferably 50 to 95% by weight.

A smaller content of the hot toluene insolubles than the above range may cause enlargement of the particle diameter by agglomeration of the polymer when the resultant crosslinked amorphous copolymer is separated from the aqueous medium and dried, to make it difficult to obtain the fine particulate crosslinked amorphous copolymer.

Also, the content outside the above range may cause difficulties when the resultant fine particulate crosslinked amorphous copolymer is applied in various uses as mentioned hereinafter.

Such a latex crosslinking treatment can be carried out by incorporating a polyfunctional monomer into the latex and according to a means known in the art, such as ionizing radiation crosslinking and organic peroxide crosslinking. As the polyfunctional monomer to be used, there may be preferably used, for example, a monomer having two or more of ethylenically unsaturated bonds, in particular, vinyl bonds or the like, which specifically can be exemplified by divinylbenzene, tetramethylene diacrylate, glyceryl triacrylate, ethylene glycol dimethacrylate, 1,2,4-trivinylcyclohexane, tetraallyloxyethane, etc.

This polyfunctional monomer is preferably used in the range of from 0.1 to 20 parts by weight, particularly from 0.3 to 5 parts by weight based on 100 parts by weight of the amorphous copolymer. In every crosslinking means, conditions are appropriately determined so that the content of hot toluene insolubles in the amorphous copolymer may be in the range mentioned above. For example, in the ionizing radiation crosslinking, any of alpha rays, beta rays, gamma rays, electron beams, X-rays, etc. may be used. The absorbed dose may be selected according to the required degree of crosslinking, and in the case of this invention, usually controlled to the range of 1 to 50 Mrad, preferably 5 to 30 Mrad. In such electron beam crosslinking, the crosslinking efficiency can be increased if a crosslinking aid is added in advance.

The organic peroxide crosslinking is carried out by homogeneously dispersing an organic peroxide in a latex, and thereafter heating the latex to a temperature higher than the decomposition temperature of the organic peroxide. The organic peroxide to be used may preferably include those having a 10 hour half-life temperature of not less than 0° C. and not more than 100° C. in the light of the stability of the latex particles and the stability and economical merit of operating the crosslinking reaction, and is specifically exemplified by the following organic peroxides:

1,1-Bis(t-butylperoxy)cyclohexane
t-Butyl peroxypivalate
t-Butyl peroxy-2-ethylhexanoate
t-Butyl peroxyisopropyl carbonate
2,5-Dimethyl-2,5-di(benzoylperoxy)hexane
3,5,5-Trimethylhexanoyl peroxide
Benzoyl peroxide
p-Chlorobenzoyl peroxide
2,4-dichlorobenzoyl peroxide
Isobutyl peroxide
Diisopropyl peroxydicarbonate
Di(2-ethylhexyl)peroxycarbonate The organic peroxide may be appropriately added in an amount of usually 0.1 to 20 parts by weight, preferably 1 to 10 parts by weight (or $3 \times 10^{-4}$ to $5 \times 10^{-2}$ mole, preferably $10^{-3}$ to $3 \times 10^{-2}$ mole). To prevent the rubber particles in the latex from being enlarged by agglomeration during the course of the crosslinking, preferably the temperature at the crosslinking is 150° C. or less and the stirring revolution number is 200 to 5000 rpm.

Although use of a crosslinking aid is not essential in crosslinking with an organic peroxide, it is preferred to be used in combination.

The crosslinking aid may include sulfur, quinonedioximes such as p-quinonedioxime, methacrylates such as polyethylene glycol dimethacrylate, allyls such as diallyl phthalate and triallyl cyanurate, and besides, maleimides, divinylbenzene, etc. Such a crosslinking aid (or vulcanization aid) may be used in an amount of ½ to 2 moles, preferably a substantially equimolar amount, per mole of the organic peroxide used.

These organic peroxides and the crosslinking aid optionally used may be previously compounded before formation of the latex, or may be compounded after formation of the latex.

The heating time for the crosslinking is preferably 5 to 10 times, in general, of the half-life, and the crosslinking can be carried out under either normal pressure or under pressure.

The amorphous copolymer is thus crosslinked in the latex state to give a crosslinked latex composition having an average particle diameter of 0.2 to 50 μm.

In this invention, the separation and drying of the finely particulate crosslinked amorphous copolymer in an aqueous medium is carried out on the above crosslinked latex composition, whereby the fine particulate crosslinked amorphous ethylene/α-olefin copolymer or amorphous ethylene/α-olefin/polyene copolymer having an average particle diameter of 0.2 to 50 μm can be obtained.

In other words, according to this invention, the crosslinking is effected in the latex state in such a manner that the content of hot toluene insolubles may be in a prescribed range, and therefore no agglomeration of the copolymer component will occur when the crosslinked amorphous copolymer is separated from the aqueous medium and dried, whereby the fine particulate crosslinked amorphous copolymer is obtained. As a method of separating and drying the finely particulate crosslinked amorphous copolymer from an aqueous medium, there may be applied a conventional drying method such as spray drying, flash drying and freeze drying. Since the amorphous copolymer has been crosslinked in the latex state and there is little re-agglomeration of the finely particulate crosslinked amorphous copolymer, the spray drying method and the flash drying method are preferred in view of the production cost.

Fine particulate crosslinked amorphous copolymer

The fine particulate crosslinked amorphous ethylene/α-olefin copolymer or amorphous ethylene/α-olefin/polyene copolymer thus obtained has an average particle diameter of 0.2 to 50 μm, and the crosslinkages are formed in the particles. Accordingly, it has rubberyness and lightweight properties, and has an excellent performance as a modifier of rubber or plastics, as well as fillers, additives for paint, ink and cosmetics.

The preferable particle diameter of the fine particulate crosslinked amorphous copolymer is in the range of from 0.2 to 20 μm, more preferably from 0.2 to 10 μm. The particle diameter can be determined by a method in which the fine particulate crosslinked amorphous copolymer is directly observed by use of an electron microscope, or can be calculated from the results obtained by observing the copolymer when dispersed in an aqueous medium in the presence of a suitable dispersant to measure the particle diameter with a commercially available particle diameter measuring apparatus. Details thereof will be mentioned hereinafter. An average particle diameter smaller than 0.2 μm may cause difficulties in that the modifying effect is extremely poor when used as an resin impact strength improver. Also, an average diameter larger than 50 μm may result in an extreme decrease in the tensile strength of the rubber when used, for example, as an improver of the extrusion moldability of the rubber.

The preferable degree of crosslinking of the fine particulate crosslinked amorphous copolymer is such that the content of hot toluene insolubles is 30 to 95% by weight, preferably 40 to 95% by weight, and more preferably 50 to 85% by weight. A hot toluene insolubles content of less than 30% by weight may result in a smaller improvement when used, for example, as an resin impact strength improver or when used as an improver of the extrusion moldability of the rubber. Also, a hot toluene insolubles content exceeding 95% may impair the flexibility of the products when used as an improver of the extrusion moldability of the rubber.

In the present specification, the average particle diameter of the particles of the fine particulate crosslinked amorphous copolymer is measured by a Coulter counter or an electron microscope. Details thereof are set out in the Examples. Also, the content of the hot toluene insolubles in the fine particulate crosslinked amorphous copolymer is measured in the following manner; the details thereof are described in the Examples. That is, the fine particulate crosslinked amorphous copolymer ($W_0$ g) is extracted with a largely excessive amount of toluene for 6 hours, and after a residue thereof has been filtered, a value weighed after the residue is dried is assumed to be $W_1$ g, followed by calculation by the formula:

$$(W_1/W_0) \times 100 \text{ (\% by weight)}$$

The content of hot toluene insolubles in the thermoplastic elastomer composition is calculated by a method described below.

Polymer composition

A typical example of the polymer resin component (B) used in the polymer composition of this invention is a crystalline polyolefin resin as mentioned before, for example, a homopolymer or copolymer of 1-olefin, having a crystallinity measured by an X-ray diffractometry of usually 40% or more, preferably 60% or more, and the type of polymerization may be either random polymerization or block polymerization. In the case of a random copolymer, the 1-olefin unit of the minor portion is contained in an amount of usually 40 mole % or less, preferably 30 mole % or less.

Such 1-olefin may include one or more of ethylene, propylene, 1-butene, 1-pentene, 1-hexene, 4-methyl-1-pentene, 1-octene, 1-decene, 1-dodecene, etc. This crystalline polyolefin resin may not be limited to the above polymer or copolymer, and may contain other olefin polymers in an amount of 40% by weight or less of the composition.

In this invention, of the crystalline polyolefin resins mentioned above, an isotactic polypropylene or a copolymer of propylene with other minor amount of α-olefin is preferably used for obtaining a composition having an excellent moldability or thermal resistance.

The polyester resin which is another typical example of the polymer resin component (B) used in the polymer composition of this invention may include, for example, a linear polyalkylene terephthalate. This polyalkylene terephthalate is a polymer or copolymer obtained by condensation of terephthalic acid with an alkylene glycol. The alkylene glycol may include ethylene glycol, propylene glycol, butanediol, hexanediol, heptanediol, octanediol, etc., which may be used alone or in combination of two or more.

Such polyester has, as mentioned before, excellent properties such as high elasticity, low creep characteristic, low water absorption characteristic, chemical resistance, high softening point, and a high electric insulating property, and has been widely used in various industrial fields.

This polyester may be also used as a copolymer by use of, in addition to terephthalic acid as an acid component, a small amount of isophthalic acid so far as the above properties are not impaired.

The polymer composition of this invention can be prepared by incorporating ethylene/α-olefin copolymer rubber particles having the above-mentioned average particle diameter, at an optional stage during synthesis of the crystalline polyolefin or the linear polyalkylene terephthalate, or alternatively, by melting and blending the synthesized resultant crystalline polyolefin or the linear polyalkylene terephthalate by means of a known kneading machine such as an extruder, a Henschel mixer, a mixing roll, a Banbury mixer, a kneader and a continuous mixer. In practical use, however, an extruder is preferably used.

In this case, it is also possible to carry out the fine dispersion of rubber by blending an ethylene/α-olefin copolymerized rubber not having been crosslinked, at an optional stage during synthesis of the crystalline polyolefin or the linear polyalkylene terephthalate, while melting and blending with an extruder or the like together with a crosslinking agent such as an organic peroxide. However, the average particle diameter can not be easily controlled.

Into the thus obtained polymer composition of this invention, a reinforcing material, a filler, a softening agent, etc., which themselves are known, may be appropriately incorporated in amounts known per se.

Thermoplastic elastomer composition

The thermoplastic elastomer composition according to this invention contains the above ethylene/α-olefin copolymerized rubber (A) and the crystalline olefin resin (B) in weight ratio of;

A:B=90:10 to 50:50, in particular, 80:20 to 60:40.

Namely, when the content ratio of the ethylene/α-olefin copolymerized rubber is larger than the above range, the properties such as the moldability and the strength may become poor, and when smaller than the above range, the rubberyness is extremely decreased.

In the elastomer composition of this invention, the crystalline polyolefin resin is present as a sealike continuous phase, and also the ethylene/α-olefin copolymerized rubber is finely dispersed in the shape of islands, in such a manner that the average particle diameter is in the range of 0.2 to 10 μm, preferably 0.2 to 5 μm, and the maximum particle diameter is 20 μm or less. An average particle diameter less than 0.2 μm may result in poor rubberyness of the thermoplastic elastomer composition, and if exceeding 10 μm may result in poor moldability and strength. Also, a maximum particle diameter exceeding 20 μm may result in unsatisfactory moldability and strength of the thermoplastic elastomer composition. The average particle diameter and maximum particle diameter in the thermoplastic elastomer composition are the values measured in the following manner:

Injection molded sheets of 2 mm thick were freeze-cut to stain the cut faces with osmium tetraoxide. After staining the dispersed rubber particles, three portions for continuous regions including 50 to 100 dispersed rubber particles were selected arbitrarily by use of an electron microscope to observe the major axis and number of dispersed rubber particles for each region, and a number average particle diameter was calculated to obtain an average value for the three regions as an average particle diameter.

| Region 1: | Number average particle diameter $A_1$ |
| Region 2: | Number average particle diameter $A_2$ |
| Region 3: | Number average particle diameter $A_3$ |

Average particle diameter of dispersed rubber particles = $\frac{1}{3}(A_1 + A_2 + A_3)$ Further, the maximum particle diameter of the dispersed rubber particles was defined as $L_1$, $L_2$, and $L_3$ by the respective maximum particle diameters observed in Regions 1, 2, and 3.

Accordingly;

Maximum particle diameter of dispersed rubber particle = $\frac{1}{3}(L_1 + L_2 + L_3)$ The content of hot toluene insolubles in the composition was measured in the following manner:

About 0.5 g of thermoplastic elastomer were weighed (assumed as $W_0$ g), extracted with 500 cc of boiled toluene for 6 hours, and filtered with a 0.05 μm filter. The residue thereof was then dried at 80° C. for 2 hours in vacuo and weighed (assumed as $W_1$ g).

$$\text{Content of hot toluene insolubles (\% by weight)} = \frac{100 \times W_1 - W_0 \times \text{\% by weight of component non-extracted with boiled toluene other than the crosslinked rubber in the composition}}{W_0 \times \text{\% by weight of copolymer rubber in the composition}}$$

The elastomer composition of this invention may further contain a softening agent of the mineral oil type or a compounding agent for rubber which itself is known in the art, so far as the strength, moldability and rubberyness of the elastomer composition are not impaired.

The mineral oil type softening agent is usually a high boiling petroleum fraction used for weakening the intermolecular attraction of rubber, to make the processing easier when rubber is subjected to a roll processing, as well as promoting the dispersion of carbon black, white carbon, etc. or lowering the hardness of vulcanized rubber to increase the flexibility and the rubberyness, and is classified into paraffinic, naphthenic series, aromatic oils, etc. In this invention, a paraffinic process oil is particularly effectively used. Such a mineral oil type softening agent can be used in an amount of 200 parts by weight or less based on 100 parts by weight of the ethylene/α-olefin copolymerized rubber. Use in an amount larger than this range may result in a loss of strength of the resultant elastomeric composition, or cause adverse effects that blooming of the softening agent occurs to damage the appearance.

As the compounding agent for rubber, there may be appropriately used, for example, fillers, colorants, aging preventive agents, antioxidants, crosslinking agents, crosslinking aids, light-resistant or light-stabilizing agents, processing aids, antistatic agents and other property improvers.

The fillers, for example, may be exemplified by carbon black, clay, talc, calcium bicarbonate, kaolin, diatomaceous earth, silica, alumina, asbestos, graphite, glass fiber, etc. The antioxidants may be exemplified by amine type antioxidants such as phenyl-α- naphthylamine, p-isopropoxydiphenylamine, N,N'-diphenylethylenediamine and nonylated diphenylamine, and phenolic antioxidants such as 2,6-ditertiarybutyl phenol, styrenated phenol, butyl hydroxyanisole, 4,4'-hydroxydiphenyl, 2,2'-methylene-bis-(4-methyl-6-cyclohexylphenol), tetrakis-[methylene-3-(3',5'-ditertiarybutyl-4'-hydroxyphenyl)propionate]methane and tris-(2-methylhydroxy-5-ditertiarybutylphenyl)butane.

Preparation of elastomer composition

In this invention, the thermoplastic elastomer composition is obtained by preparing a latex of the above-mentioned ethylene/α-olefin copolymerized rubber to carry out the crosslinking in the latex state, and compounding in various manners the crystalline polyolefin resin into the crosslinked latex serving as the main starting material.

The production of the thermoplastic elastomer of this invention can be carried out by melt blending the fine particulate crosslinked copolymerized rubber obtained by drying the crosslinked copolymerized rubber latex and the crystalline polyolefin resin in the form of pellets or powder in the proportion of 90:10 to 50:50 in weight ratio by means of an enclosed mixer such as a Banbury mixer or a monoaxial or multiaxial extruder. The ratio of the fine particulate crosslinked copolymerized rubber exceeding the above upper limit may result in an extremely lowered moldability and strength of the thermoplastic elastomer, and the ratio of the fine particulate crosslinked copolymerized rubber falling below the above lower limit may cause an adverse effect such that the rubberyness is extremely lowered. The temperature for the melt blending may vary depending on the melting point of the crystalline polyolefin resin, but is preferably 150° C. to 260° C.

Also, the blending of the crystalline polyolefin resin may be carried out by mixing the polyolefin resin at the stage of formation of the latex of the ethylene/α-olefin copolymerized rubber together with an aqueous medium, homogeneously dispersing the resin, and thereafter carrying out the crosslinking, followed by drying and melt blending in the manner as mentioned above, or, alternatively, by mixing the polyolefin resin into the crosslinked latex composition of the ethylene/α-olefin copolymerized rubber together with an aqueous medium, and homogeneously dispersing the resin, followed by drying and melt blending.

The mineral oil type softening agent and the compounding agent for rubber which itself is known in the art may be incorporated if necessary at the stage of the melt blending in either case.

In the thermoplastic elastomer composition thus obtained, the crystalline polyolefin resin is present as a sea-like continuous phase, and also the ethylene/α-olefin copolymerized rubber is present as the phase of islands homogeneously dispersed in a fine particulate state, having not only excellent mechanical properties such as moldability, weathering resistance and strength but also excellent rubberyness.

Latex composition

In the latex composition of this invention, as the base polymer in the latex, there is used the amorphous ethylene/α-olefin copolymer or amorphous ethylene/α-olefin/polyene copolymer mentioned before. The ethylene content in these amorphous copolymers is preferably in the range of from 50 to 87 mole %, particularly from 63 to 80 mole %, to achieve this object.

Of the copolymers constituted as mentioned above, as the amorphous copolymer used as a base polymer in the latex composition according to this invention, preferably used are those having an intrinsic viscosity in a decahydronaphthalene solution at 135° C. in the range of from 0.5 to 3.0 dl/g, particularly from 0.7 to 1.5 dl/g.

Namely, the average molecular weight of the amorphous copolymer used has an important influence on the control of the particle diameter at the formation of a latex or the properties of the latex composition to be obtained. For instance, if the above-mentioned intrinsic viscosity is smaller than 0.5 dl/g, the resin may have unsatisfactory impact resistance, etc. when a thermoplastic graft copolymer resin is produced by using the resultant crosslinked latex composition as a starting material.

Also, if those having an intrinsic viscosity exceeding 3.0 dl/g are used, it becomes difficult to control the average particle diameter of the solids in the latex to 50 μm or less to lower the storage stability of the composition itself.

The crosslinked latex composition of this invention, comprising as a base polymer the above amorphous copolymer component, has several properties that have not been found in conventional latex compositions.

First, the composition of this invention has an average particle diameter of solids in the range of 0.2 to 50 μm, preferably 0.2 to 10 μm, more preferably 0.2 to 3.0 μm, and further preferably 0.3 to 2.0 μm. An average particle diameter smaller than 0.2 μm may result in an insufficient impact resistance and gloss of the thermoplastic graft copolymer obtained by using this crosslinked latex composition as a base material. On the other hand, the same exceeding 50 μm may result in an unstable state as a latex at the graft polymerization, whereby the resultant graft copolymer may have an extremely unsatisfactory weathering resistance, impact resistance, and gloss.

The crosslinked latex composition of this invention also has a content of hot toluene insolubles (gel percentage) in the amorphous copolymer component in the range of 30 to 95% by weight, preferably 60 to 90% by weight.

A gel percentage lower than 30% by weight may result in an unsatisfactory impact resistance and gloss of the resultant thermal graft copolymer. On the other hand, a gel percentage exceeding 95% by weight tends to cause a decrease in the impact resistance. It is further preferred that the crosslinked latex composition contain, as mentioned above, a crystalline low molecular α-olefin copolymer having a density of 0.90 g/cm$^3$ or more, or a modified copolymer thereof, alone or in combination of two or more kinds.

In the latex composition according to this invention, crosslinkages are formed in the amorphous copolymer which is a base polymer, whereby the so-called graft efficiency is improved to make it possible to use the composition as a starting material to obtain a thermal graft copolymer resin having excellent properties such as impact resistance, weathering resistance, and surface gloss.

The crosslinked latex composition of this invention may further contain, if necessary, known compounding agents such as pigments, thickening agents, surfactants, antiseptic agents, antifoaming agents and pH controllers in an amount known itself in the art. Of course, these compounding agents may be contained in the latex either before the crosslinking or after the crosslinking.

CAPABILITY OF EXPLOITATION IN INDUSTRY

The fine particulate crosslinked amorphous ethylene/α-olefin copolymer and the latex composition thereof according to this invention can be preferably applied in various uses.

First, in the state of the crosslinked composition, it can be used for the production of dip coated rubber products such as industrial rubber gloves, electric gloves and coated cloth; for the production of cast molding rubber products such as footwear soles; and as a paper treatment agent for such as weathering resistant binders for clay coating and coating agents for release papers.

By using particularly an aromatic alkenyl compound and a vinyl monomer such as a monomer copolymerizable with said compound, the crosslinked latex composition of this invention can be graft copolymerized with the same to obtain a thermoplastic graft copolymer having remarkably excellent properties such as impact resistance, weathering resistance, and surface gloss.

The aromatic alkenyl compound may include styrene, α-methylstyrene, p-methylstyrene, o-methylstyrene, etc., which may be used alone or in combination of two or more.

The monomer copolymerizable with the aromatic alkenyl compound may include, for example, vinyl cyan compounds such as acrylonitrile and methacrylonitrile; acrylates such as methyl acrylate, ethyl acrylate, butyl acrylate and octyl acrylate; and methacrylates such as methyl methacrylate, ethyl methacrylate, butyl methacrylate and octyl methacrylate, which may be used alone or in combination of two or more.

The amount used may vary depending on the kind thereof, but, in general, is selected from the range of 60 to 500 parts by weight based on 100 parts by weight of the rubber component in the crosslinked latex in the case of the alkenyl compound, or 60 to 300 parts by weight based on 100 parts by weight of the rubber component in the crosslinked latex in the case of the monomer copolymerizable with the alkenyl compound.

The graft copolymerization of the crosslinked latex composition with the alkenyl compound and the monomer copolymerizable with the alkenyl compound may be carried out by a means known itself in the art, for example, by adding the above aromatic alkenyl compound and so on in the crosslinked latex, and further adding a radical generating agent in a predetermined amount, followed by heating or exposure to radiation.

The thermoplastic graft copolymer thus obtained has remarkably excellent properties such as impact resistance, weathering resistance and surface gloss, as will be shown in the Examples described hereinafter.

The crosslinked latex composition can be further modified with a small amount of the above vinyl monomer, for example, a vinyl monomer in an amount of 5 to 60 parts by weight based on 100 parts by weight of the rubber component in the rubber latex to obtain a thermoplastic elastomer having excellent moldability and rubberyness, which can be applied to automobile parts such as bellows, tubes, interior sheets, mudguards, bumpers, wind trims and front grills; industrial machine parts such as pressure hoses, gaskets and diaphragms; electronic and electric equipment parts; marine parts such as boat bodies, motor boat engine covers, decks and plates; and construction materials.

In the state where the aqueous medium has been removed from the crosslinked latex to give a fine particulate crosslinked amorphous copolymer, the composition is not only useful as a component for the above polymer composition or the thermoplastic elastomer composition, but also useful as a modifier of various rubbers or plastics as well as a filler or an additive for ink, paint or cosmetics. The rubbers for which the fine particulate crosslinked amorphous copolymer is modified may be exemplified by natural rubber, as well as all kinds of synthetic rubbers such as SBR, BR, IIR, NBR, epichlorohydrin rubber, aryl rubber, fluorine rubber, EPM and EPDM. The plastics for which it is modified may include not only the above polyolefins and polyesters, but also general-purpose plastics such as polystyrene and vinyl chloride, as well as engineering plastics such as ABS, nylon, polyester, polyphenylene oxide and PPE. When used for modifying the component (B) of rubber and plastics, the ratio of the component (A) to the component (B) is preferably;

A/B=33/67 to 1/99.

The melt blending can be carried out by use of the above-mentioned known kneading apparatus. When mixed into paint, the covering property of a coating is improved. In cosmetics, it can be used as a binder for pigments.

EXAMPLES

This invention will be described in greater detail by the following Examples and Comparative Examples, but, of course, the scope of the invention is by no means limited to these Examples.

EXAMPLE 1

As an amorphous copolymer, 100 g of ethylene/propylene/ethylidenenorbornene copolymer rubber (ethylene unit content: 72 mole %; containing as a polyene component, 15 5-ethylidene-2-norbornene units in terms of iodine value; intrinsic viscosity $[\eta]$ in 135° C. decalin: 1.0 dl/g; hereinafter simplified as EPT) were dissolved in 900 g of n-hexane, and stirred until the solution became homogeneous.

Subsequently, as a surfactant, 5 g of potassium oleate were dispersed in 900 g of water, and thereafter mixed into the above solution by use of a homomixer for 60 minutes with a stirring blade revolution number of 10,000 rpm. The resultant emulsion was distilled at a temperature of 60° to 80° C. to remove n-hexane to obtain a latex.

To the latex thus obtained, 0.5 part by weight of p-divinylbenzene and 0.3 part by weight of di-t-butyl peroxytrimethylcyclohexane based on 100 parts by weight of rubber component were added and sufficiently dispersed.

Next, this latex was moved to an autoclave to carry out crosslinking while heating at 120° C. for 2 hours under pressure of 3 kg/cm$^3$ with N$_2$.

Crosslinked latex thus obtained was treated by use of a disc spray type spray dryer under the conditions of a disc revolution number of 25,000 rpm, a crosslinked latex feed of 10 kg/hr, a feed gas temperature of 200° C. and a gas flow rate of 8 m$^3$/hr to obtain a fine particulate crosslinked amorphous copolymer.

This fine particulate crosslinked amorphous copolymer had an average particle diameter of 2.0 μm and a content of hot toluene insolubles of 41 wt. %.

Measurements of the average particle diameter and the gel percentage were carried out in the following manner:

(1) Measurement of average particle diameter:

Three portions for regions including 50 to 100 fine particulate rubber particles were arbitrarily selected by use of an electron microscope to observe the major axis and number of particles for each region, and a number average particle diameter was calculated to define an average value for the three regions as an average particle diameter as follows:

| Region 1: | Number average particle diameter $A_1$ |
| Region 2: | Number average particle diameter $A_2$ |
| Region 3: | Number average particle diameter $A_3$ |

Average particle diameter = $\frac{1}{3}(A_1 + A_2 + A_3)$

The fine particulate crosslinked amorphous copolymer in amount of 1.5 g was collected in a 100 mesh net bag, and dipped into 100 cc of 120° C. toluene for 6 hours. Subsequently, this was taken out and dried at 80° C. for 2 hours in vacuo, followed by measurement of the weight of residues in the net bag, assuming the value thereof to be $W_1$ g. From this value, the hot toluene insolubles content (gel percentage) was calculated according to the following formula:

$$\text{Hot toluene insolubles (wt. \%)} = \frac{W_1}{1.5} \times 100$$

An attempt was made to use the fine particulate crosslinked amorphous copolymer thus obtained as a modifier for a polypropylene resin. That is, 80 parts by weight of a polypropylene resin having a melt flow rate of 10 g/10 min. measured at 230° C., a density of 0.91 g/cm³, an Izod impact strength (notched) of 3 kg.cm/cm of a sheet injection molded under the conditions mentioned below, and an initial flexural modulus of 17,000 kg/cm², and 20 parts by weight of the fine particulate crosslinked amorphous copolymer were melt blended at a resin temperature of 255° C. with use of an extruder of of 65 mmφ, and formed into pellets.

| Injection primary pressure: | 1,000 kg/cm², 5 sec. cycle |
| Dwell secondary pressure: | 800 kg/cm², 5 sec. cycle |
| Injection speed: | 40 mm/sec. |
| Resin temperature: | 260° C. |

The resultant modified polypropylene resin was injection molded under the following conditions, and the Izod impact strength of a sheet (notched; ASTM D256; 23° C.) and the initial flexural modulus (ASTM D790) were measured. The results obtained are shown in Table 1.

EXAMPLES 2 to 7

Example 1 was repeated, except that the following points were revised.

| Example No. | 2 | 3 | 4 | 5 | 6 | 7 |
|---|---|---|---|---|---|---|
| $[\eta]_{decalin}^{135°\,C.}$ of amorphous copolymer | 2.2 | 2.5 | 2.7 | — | — | — |
| Revolution number (rpm) of homomixer | — | 8000 | 7000 | — | — | — |
| Average particle diameter (μm) | 5 | 15 | 40 | — | — | — |
| p-Divinylbenzene (parts by weight) | — | — | — | 0.2 | 1.0 | 4.0 |
| Di-t-butyl peroxytrimethyl-cyclohexane (parts by weight) | — | — | — | 0.1 | 1.0 | 3.0 |
| Hot toluene insolubles content (wt. %) | 40 | 42 | 40 | 25 | 60 | 87 |

EXAMPLE 8

Example 1 was repeated, except that an ethylene/propylene/polyene copolymer rubber in the form of pellets having a pellet major axis of 5 mm (ethylene unit content: 72 mole %; containing as a polyene component, 15 5-ethylidene norbornene units in term of iodine value; $[\eta]_{decalin}^{135°\,C.}$: 1.0 dl/g) was used in place of the fine particulate crosslinked amorphous copolymer used in Example 1.

EXAMPLE 9

Example 1 was repeated, except that, after a latex was obtained in the same procedures as in Example 1, it was freeze-dried without the crosslinking procedure to obtain a fine particulate crosslinked amorphous copolymer, which was used as a modifier for a propylene resin.

EXAMPLES 10 AND 11

Example 1 was repeated, except that the following points were changed.

| | Example 10 | Example 11 |
|---|---|---|
| [η] of amorphous copolymer | 0.3 | 3.3 |
| Average particle diameter (μm) | 0.1 | 70 |
| p-Divinylbenzene (parts by weight) | 1.0 | 1.0 |
| Di-t-butyl peroxymethylcyclohexane (parts by weight) | 0.5 | 0.5 |
| Hot toluene insolubles content (wt. %) | 50 | 50 |

EXAMPLE 12

In the same procedures as in Example 1, a fine particulate crosslinked amorphous copolymer having the same profiles was obtained. This was compounded into EPT with the following compounding formulation:

| Compounding ingredients | parts by weight |
|---|---|
| EPT (ML$_{1+4(100°C.)}$: 80; ethylene content: 72 mole %, ENB content: 12 as iodine value) | 85 |
| Finely particulate crosslinked amorphous copolymer | 15 |
| Zinc oxide | 5 |
| Stearic acid | 1.5 |
| FEF carbon black (produced by Tokai Carbon Co; Seast SO) | 125 |
| Process oil (produced by Idemitsu Kosan Co.; PW 380) | 90 |
| Defoaming agent (produced by Ohmi Kagaku Co.; CML 21) | 7 |

-continued

| Compounding ingredients | parts by weight |
|---|---|
| Vulcanizing accelerators: | |
| 2-Mercaptobenzothiazole | 0.4 |
| Tetramethylthiuram disulfide | 1.0 |
| Dipentamethylenethiuram tetrasulfide | 1.5 |
| Tellurium diethyldithiocarbamate | 0.5 |
| Zinc di-n-butyldithiocarbamate | 0.5 |
| 2-(4'-morpholinodithio)benzothiazole | 1.0 |
| Sulfur | 0.7 |

In compounding, first the EPT, fine particulate crosslinked amorphous copolymer, zinc oxide, stearic acid, carbon black, process oil and defoaming agent were kneaded in a 4.3 lit. Banbury mixer for 6 minutes, and allowed to stand at room temperature for 24 hours. Next, the vulcanizing agents and sulfur were added and kneaded with use of a 14 inch open roll for 10 minutes to obtain EPT compounded rubber. This EPT compounded rubber was fed to a 50 mm$\phi$ extruder, and EPT compounded tubes obtained by passing a dye having a tube die outer diameter of 16 mm and an inner diameter of 14 mm under the conditions of an extrusion temperature of 80° C. and 2 m/min were introduced into a hot air vulcanizing tank at 200° C. for 6 minutes to carry out the vulcanization to obtain EPT compounded vulcanized tubes. On the tubes obtained, the following measurements were carried out:

(1) Shape retention percentage at the extrusion molding:

Maximum diameter (outer diameter) and minimum diameter (outer diameter) of the tubes obtained were measured, and the shape retention percentage was determined by (minimum diameter/maximum diameter)×100.

(2) Tensile strength of vulcanized rubber:

Tubes obtained were cut open in the longitudinal direction, and test pieces were punched with use of a JIS No. 3 dumbbell die to measure the tensile strength of the vulcanized rubber according to JIS K6301.

Results of the foregoing are shown in Table 2.

EXAMPLES 13 to 18

Fine particulate crosslinked amorphous copolymers were prepared in Examples 13, 14, 15, 16, 17 and 18 following the procedures in Examples 2, 3, 4, 5, 6 and 7, respectively, and kneaded with EPT in the same manner as in Example 12.

EXAMPLE 19

Without compounding the fine particulate crosslinked amorphous copolymer, EPT as 100 parts by weight was kneaded.

EXAMPLE 20

A fine particulate crosslinked amorphous copolymer was prepared following the procedures in Example 9, and kneaded with EPT in the same manner as in Example 12.

EXAMPLE 21

A fine particulate crosslinked amorphous copolymer was prepared following the procedures in Example 11, and kneaded with EPT in the same manner as in Example 12.

EXAMPLE 22

Example 1 was repeated, except that an ethylene/propylene binary copolymer (ethylene unit content: 72 mole %; intrinsic viscosity [$\eta$] in 135° C. decalin: 1.0 dl/g) was used as the amorphous copolymer. Results are shown in Table 1.

EXAMPLE 23

Example 12 was repeated, except that an ethylene/propylene binary copolymer (ethylene unit content: 72 mole %; intrinsic viscosity [$\eta$] in 135° C. decalin: 1.0 dl/g) was used as the amorphous copolymer. Results are shown in Table 2.

TABLE 1

| | Examples of modification of polypropylene resins | | | | | | | | | | | |
|---|---|---|---|---|---|---|---|---|---|---|---|---|
| | Example No. | | | | | | | | | | | |
| | 1 | 2 | 3 | 4 | 5 | 6 | 7 | 8 | 9 | 10 | 11 | 22* |
| <Profiles of fine particulate crosslinked rubber> | | | | | | | | | | | | |
| $[\eta]_{decalin}^{135°\,C.}$ (dl/g) of starting EPT | 1.0 | 2.2 | 2.5 | 2.7 | 1.0 | 1.0 | 1.0 | — | 1.0 | 0.3 | 3.3 | 1.0 |
| Average particle diameter ($\mu$m) | 2 | 5 | 15 | 40 | 2 | 2 | 2 | — | 2 | 0.1 | 70 | 2 |
| Hot toluene insolubles content (wt. %) | 41 | 40 | 42 | 40 | 25 | 60 | 87 | — | 0 | 50 | 50 | 40 |
| <Properties of polypropylene resin after modification> | | | | | | | | | | | | |
| Izod impact strength (kg · cm/cm) | 12 | 12 | 12 | 10 | 12 | 12 | 12 | 8 | 8 | 8 | 6 | 12 |
| Initial flexural modulus (kg/cm²) | 14000 | 14000 | 14000 | 14000 | 13000 | 14500 | 15000 | 12500 | 12500 | 14500 | 12000 | 14000 |

*EPR was used as the starting material.

TABLE 2

| | Examples of modification of ethylene/polypropylene rubbers | | | | | | | | | | |
|---|---|---|---|---|---|---|---|---|---|---|---|
| | Example No. | | | | | | | | | | |
| | 12 | 13 | 14 | 15 | 16 | 17 | 18 | 19 | 20 | 21 | 23* |
| <Profiles of fine particulate crosslinked rubber> | | | | | | | | | | | |
| $[\eta]_{decalin}^{135°\,C.}$ (dl/g) of starting EPT | 1.0 | 2.2 | 2.5 | 2.7 | 1.0 | 1.0 | 1.0 | — | 1.0 | 3.3 | 1.0 |
| Average particle diameter | 2 | 5 | 15 | 40 | 2 | 2 | 2 | — | 2 | 70 | 2 |

TABLE 2-continued

Examples of modification of ethylene/polypropylene rubbers

| | Example No. | | | | | | | | | | |
|---|---|---|---|---|---|---|---|---|---|---|---|
| | 12 | 13 | 14 | 15 | 16 | 17 | 18 | 19 | 20 | 21 | 23* |
| (μm) | | | | | | | | | | | |
| Hot toluene insolubles content (wt. %) | 41 | 40 | 42 | 40 | 25 | 60 | 87 | — | 0 | 50 | 40 |
| <Properties of EPT compounded rubber after modification> | | | | | | | | | | | |
| Shape retention percentage at extrusion molding (%) | 81 | 82 | 80 | 80 | 75 | 80 | 81 | 60 | 60 | 60 | 80 |
| Tensile strength of vulcanized rubber (kg/cm²) | 130 | 135 | 128 | 125 | 131 | 134 | 132 | 131 | 132 | 80 | 131 |

*EPR was used as the starting material.

EXAMPLE 24

As an ethylene α-olefin copolymer, 100 g of ethylene/propylene/ethylidenenorbornene coppolymerized rubber (ethylene unit content: 72 mole %; containing as a polyene component, 15 5-ethylidene-2-norbornene units in terms of iodine value; intrinsic viscosity [η] in 135° C. decahydronaphthalene: 1.1 dl/g; hereinafter simiplified as EPT) and as a low molecular α-olefin copolymer 11 g of modified polyethylene was (maleic anhydride unit content: 3% by weight; density: 0.93 g/cc; softening point: 111° C.) were dissolved in 900 g of n-hexane, and stirred until the solution became homogeneous.

Subsequently, as a surfactant, 5 g of potassium oleate were dispersed in 900 g of water, and thereafter mixed into the above solution by use of a homomixer for 60 minutes with a stirring blade revolution number of 10,000 rpm. The resultant emulsion was distilled at a temperature of 60° to 80° C. to remove n-hexane to obtain a latex. To the latex thus obtained, an adequate amount of p-divinylbenzene and di-t-butyl peroxytrimethylcyclohexane was added so as to have the hot toluene insolubles content as shown in Table 3, and sufficiently dispersed, and then the latex was moved to an autoclave to carry out crosslinking while heating at 120° C. for 2 hours under pressure of 3 kg/cm³ with $N_2$. The average particle diameter and the content of hot toluene insolubles were measured and shown in Table 3.

The crosslinked latex thus obtained was treated by use of a disc spray type spray dryer under the conditions of a disc revolution number of 25,000 rpm, a crosslinked latex feed of 10 kg/hr, a feed gas temperature of 200° C. and a gas flow rate of 8 m³/hr to obtain a finely particulate crosslinked amorphous copolymer.

Subsequently, the fine particulate crosslinked copolymerized rubber obtained by the above procedures and polypropylene having MFR (230° C., 2.16 kg) of 11 g/10 min. and a density of 0.91 g/cc, used in weight ratio of the copolymerized rubber to the polypropylene of 70:30 were melt blended by means of an extruder under the condition of an extrusion temperature of 230° C., and formed into pellets.

The thermoplastic elastomer obtained was injection molded at an injection temperature of 240° C. to form sheets of 2 mm thick, and the following respective properties were measured.

Moldability: MFR (230° C., 10 kg), g/10 min., ASTM D-1238
Rubberyness: PS % (applying 100% strain), JISK 6301
Strength: TB kg/cm³, JISK 6301
Results are shown in Table 3.

EXAMPLE 25

Example 24 was repeated, except that 70 g of EPT having [η] of 0.8 dl/g, 30 g of polypropylene and 21 g of a modified polyethylene wax were dissolved in n-hexane.

EXAMPLE 26

Example 24 was repeated, except that, into a crosslinked copolymerized rubber latex formed by the same procedures as in Example 24 by using EPT having [η] of 1.3 dl/g, a polypropylene latex prepared by dissolving 100 g of a copolymerized rubber replacing the 100 g of polypropylene used in Example 24 in an aqueous medium by the same production process as that for the copolymerized rubber latex was mixed in a weight ratio of copolymerized rubber to polypropylene of 70:30, and thereafter the aqueous medium was dried and removed.

EXAMPLES 27 to 34

Example 24 were repeated except for changes in the following points:

| | Example | | | | | | | |
|---|---|---|---|---|---|---|---|---|
| | 27 | 28 | 29 | 30 | 31 | 32 | 33 | 34 |
| $[\eta]_{decalin}^{135°C.}$(dl/g) of EPT | 1.4 | 1.5 | 2.5 | 2.7 | 1.1 | 1.1 | 1.3 | 1.3 |
| Compounding amount of modified polyethylene wax | 12 | 20 | 25 | 25 | 8* | 8 | 11 | 11 |

*an unmodified polyethylene wax having a density of 0.92 g/cm³ and a softening point of 113° C. was used.

EXAMPLE 35

EPT and polypropylene used in Example 24 were kneaded in weight ratio of 70:30 by means of a Banbury mixer for 5 minutes, and thereafter, using a Brabender mixer, 0.2 part by weight of dicumylperoxide and 0.2 part by weight of divinylbenzene based on 100 parts by weight of a mixture of the EPT and polypropylene were compounded to carry out dynamic crosslinking blending for 7 minutes under the conditions of an oil bah temperature of 180° C. and a revolution number of 60 rpm to produce a thermoplastic elastomer, which was molded to measure its properties.

EXAMPLE 36

Example 35 was repeated, excet that the condition for the revolution number of Brabender mixer was changed to 150 rpm.

EXAMPLES 37 to 40

Finely particulate crosslinked copolymerized rubbers were prepared in the same manner as in Example 24 except for the following points, and then Example 24 was repeated, except that the weight ratios of the fine particulate crosslinked copolymerized rubber to polypropylene were changed as shown in Table 3.

|  | Example | | | |
|---|---|---|---|---|
|  | 37 | 38 | 39 | 40 |
| $[\eta]_{decahydronapthalene}^{135°\ C.}$ (dl/g) of EPT | 0.4 | 3.5 | 1.3 | 1.3 |
| Compounding amount of modified polyethylene wax | 70 | 1.4 | 11 | 11 | sheets having an Izod impact strength (notched) of 3.2 kg.cm/cm and a flexural modulus of $3.5 \times 10^4$ kg/cm$^2$.

(2) Rubber component:

EPT having an ethylene content of 65 mole %, a Mooney viscosity $ML_{1+4}(100°\ C.)$ of 10, containing as a polyene component 12 units of ethylidenenorbornene, was used as a rubber component.

This EPT was emulsified, regulating the average particle diameter of rubber particles in the state of an aqueous emulsion to various sizes, and crosslinked by electron beam crosslinking, followed by drying to prepare finely particulate crosslinked EPTs having the hot toluene insolubles content and the average particle diameter in various ranges.

(3) Based on 100 parts by weight of the above polyethylene terephthalate terephthalate, the above fine particulate rubbers were melt blended by means of an

TABLE 3

| Items: | Example No. | | | | | | | | |
|---|---|---|---|---|---|---|---|---|---|
|  | 24 | 35* | 36* | 25 | 26 | 27 | 28 | 29 | 30 |
| <Profiles of latex composition> | | | | | | | | | |
| $[\eta]_{decalin}^{135°\ C.}$ (dl/g) of copolymerized rubber | 1.1 | — | — | 0.8 | 1.3 | 1.4 | 1.5 | 2.5 | 2.7 |
| Average particle diameter (μm) | 0.8 | — | — | 0.5 | 1.0 | 1.1 | 2.5 | 4.0 | 8.0 |
| Hot toluene insolubles content (wt. %) | 60 | — | — | 45 | 59 | 60 | 40 | 55 | 80 |
| <Profiles and properties of thermoplastic elastomer> | | | | | | | | | |
| Weight ratio of copolymerized rubber/ crystalline polyolefin | 70/30 | 70/30 | 70/30 | 70/30 | 70/30 | 70/30 | 70/30 | 70/30 | 70/30 |
| Low molecular α-olefin content (g/100 g) (copolymerized rubber) | 11 | 0 | 0 | 30 | 30 | 12 | 20 | 25 | 25 |
| Average particle diameter of dispersed rubber particles (μm) | 0.9 | 15 | 1.5 | 0.6 | 1.1 | 1.2 | 2.6 | 4.1 | 8.0 |
| Maximum diameter of dispersed rubber particles (μm) | 5.0 | 100 | 25 | 5.0 | 5.0 | 8.0 | 10 | 15 | 18 |
| Hot toluene insolubles content in dispersed rubber particles (wt. %) | 61 | 60 | 60 | 45 | 58 | 61 | 41 | 55 | 81 |
| Moldability (MFR, 230° C., 10 kg, g/10 min) | 20 | 2 | 4 | 23 | 21 | 20 | 18 | 17 | 14 |
| Rubberyness (PS %) | 15 | 15 | 18 | 15 | 16 | 14 | 12 | 14 | 15 |
| Strength (TB kg/cm$^2$) | 113 | 50 | 63 | 105 | 105 | 103 | 98 | 93 | 85 |

| Items: | Example No. | | | | | | | |
|---|---|---|---|---|---|---|---|---|
|  | 31 | 32 | 37 | 38 | 33 | 34 | 39 | 40 |
| <Profiles of latex composition> | | | | | | | | |
| $[\eta]_{decalin}^{135°\ C.}$ (dl/g) of copolymerized rubber | 1.1 | 1.1 | 0.4 | 3.5 | 1.3 | 1.3 | 1.3 | 1.3 |
| Average particle diameter (μm) | 0.8 | 0.8 | 0.05 | 12 | 1.0 | 1.0 | 1.0 | 1.0 |
| Hot toluene insolubles content (wt. %) | 35 | 83 | 98 | 25 | 60 | 60 | 60 | 60 |
| <Profiles and properties of thermoplastic elastomer> | | | | | | | | |
| Weight ratio of copolymerized rubber/ crystalline polyolefin | 70/30 | 70/30 | 70/30 | 70/30 | 85/15 | 55/45 | 95/5 | 45/55 |
| Low molecular α-olefin content (g/100 g) (copolymerized rubber) | 8 | 8 | 70 | 1.4 | 11 | 11 | 11 | 11 |
| Average particle diameter of dispersed rubber particles (μm) | 1.3 | 0.8 | 0.05 | 25 | 1.0 | 1.0 | 1.0 | 1.0 |
| Maximum diameter of dispersed rubber particles (μm) | 8.0 | 4.0 | 0.5 | 115 | 5.0 | 5.0 | 5.0 | 5.0 |
| Hot toluene insolubles content in dispersed rubber particles (wt. %) | 35 | 83 | 98 | 25 | 60 | 60 | 60 | 60 |
| Moldability (MFR, 230° C., 10 kg, g/10 min) | 18 | 22 | 28 | 1 | 14 | 37 | 1 | 45 |
| Rubberyness (PS %) | 14 | 15 | 60 | 16 | 10 | 29 | 10 | 70 |
| Strength (TB kg/cm$^2$) | 102 | 114 | 110 | 40 | 90 | 150 | 41 | 180 |

*Copolymerized rubber having [η] of 1.1 dl/g was used as it is, without formation into a latex.

EXAMPLES 41 to 57

(1) Polyester:

Polyethylene terephthalate having an intrinsic viscosity [η] in a 25° C. orthochlorophenol solution of 0.86 dl/g was used as a linear polyalkylene terephthalate.

This polyethylene terephthalate was injection molded at a mold temperature of 140° C. to obtain extruder according to the compounding amount as shown in Table 1, and formed into pellets.

The pellets of the polyester composition were injection molded at a mold temperature of 140° C. to measure the various properties. Results thereof are shown in Table 4.

(i) Average particle diameter of dispersed rubber particles:

Injection molded sheets of 2 mm thick were freeze-cut to stain the cut faces with osmium tetraoxide. After staining dispersed rubber particles, three portions for continuous regions including 50 to 100 dispersed rubber particles were arbitrarily selected by use of an electron microscope to observe the major axis and number of dispersed rubber particles for each region, and a number average particle diameter was calculated to regard an average value for the three regions as an average particle diameter.

| ex. Region 1: | Number average particle diameter $A_1$ |
| ex. Region 2: | Number average particle diameter $A_2$ |
| ex. Region 3: | Number average particle diameter $A_3$ |

Average particle diameter of dispersed rubber particles = $\frac{1}{3}(A_1 + A_2 + A_3)$ (ii) Content of hot toluene insolubles:

One g of injection molded sheets was weighed, and extracted with 200 cc of o-chlorophenol for 6 hours, followed by drying unextracted component, which was then weighed. The weight thus determined is assumed to be $W_0$.

The unextracted component in whole amount was dipped into 150 cc of boiled toluene, and filtered by a 0.05 μm filter, followed by drying of the residue, which was then weighed. The weight thus determined is assumed to be $W_1$.

Hot toluene insolubles content = $W_1/W_0 \times 100$ (% by weight)

(iii) Izod impact strength:
Measured in accordance with ASTM D256.
(iv) Flexural modulus:
Measured in accordance with ASTM D790.

ring blade revolution number: 12,000 rpm) for 60 minutes. The resultant emulsion was distilled at a temperature of 60° to 80° C. to remove n-hexane to obtain a latex.

To the latex thus obtained, 2 parts by weight of p-divinylbenzene based on 100 parts by weight of rubber component were added and sufficiently dispersed.

Subsequently, using an electron ray irradiation apparatus, crosslinking reaction was carried out by irradiating 20 Mrad of electron rays at an accelerating voltage of 750 kV to obtain a crosslinked latex composition.

This composition had an average particle diameter of 1.0 μm and a gel percentage of 71% by weight.

The average particle diameter and the gel percentage were measured in the following manner:

(1) Measurement of average particle diameter:

Using a Coulter counter produced by Coulter Electronics Co., total number of the particles in the latex composition is counted to prepare a histogram for the weight per particle diameter and a histogram for the accumulated weight. Here, the point where the accumulated weight histogram becomes 50% is defined as the average particle diameter.

(2) Content of hot toluene insolubles (gel percentage):

Whole solids in the latex composition are coagulated, dried, and collected in an amount of 1.5 g in a 100 mesh net bag made of stainless steel, followed by dipping in 100 cc of 120° C. toluene for 6 hours. Subsequently, after being taken out and dried, the weight of the residue in the net bag was measured to calculate the amount of hot toluene insolubles (gel percentage) to use it as a measure of the degree of crosslinking.

Next, using the crosslinked latex composition as a base material, a graft polymerization reaction was carried out at 70° C. over a period of 4 hours in the atmo-

TABLE 4

| Items: | Example No. | | | | | | | | |
|---|---|---|---|---|---|---|---|---|---|
| | 41 | 42 | 43 | 44 | 51* | 52 | 53 | 45 | 46 |
| Profiles of dispersed rubber particles: | | | | | | | | | |
| Average particle diameter (μm) | 1.5 | 1.8 | 2.0 | 1.8 | 20 | 2.0 | 1.8 | 0.4 | 4 |
| Hot toluene insolubles content (wt. %) | 40 | 51 | 65 | 80 | 0 | 20 | 98 | 65 | 65 |
| Rubber mixing amount (parts by weight) | 10 | 10 | 10 | 10 | 10 | 10 | 10 | 10 | 10 |
| Sheet properties: | | | | | | | | | |
| Izod impact strength (kg·cm/cm) | 8.1 | 9.1 | 9.5 | 9.6 | 4.9 | 5.0 | 4.9 | 8.9 | 9.2 |
| Flexural modulus (kg/cm²) × $10^{-1}$ | 3.15 | 3.17 | 3.20 | 3.25 | 2.80 | 2.98 | 3.25 | 3.21 | 3.20 |

| Items: | Example No. | | | | | | | |
|---|---|---|---|---|---|---|---|---|
| | 47 | 54 | 55 | 48 | 49 | 50 | 56 | 57 |
| Profiles of dispersed rubber particles: | | | | | | | | |
| Average particle diameter (μm) | 8 | 0.05 | 15 | 1.8 | 2.0 | 1.8 | 2.1 | 2.0 |
| Hot toluene insolubles content (wt. %) | 65 | 65 | 65 | 65 | 65 | 80 | 65 | 65 |
| Rubber mixing amount (parts by weight) | 10 | 10 | 10 | 5 | 20 | 40 | 60 | 0.5 |
| Sheet properties: | | | | | | | | |
| Izod impact strength (kg·cm/cm) | 9.0 | 4.5 | 8.0 | 7.0 | 15.1 | 21.5 | 29.5 | 3.4 |
| Flexural modulus (kg/cm²) × $10^{-1}$ | 3.05 | 3.21 | 2.85 | 3.35 | 3.01 | 3.00 | 1.50 | 3.40 |

*Uncrosslinked EPT was used in Example 51.

EXAMPLE 58

As an amorphous copolymer, 100 g of ethylene/propylene/ethylidenenorbornene copolymer rubber (ethylene unit content: 72 mole %; containing as a polyene component, 15 5-ethylidene-2-norbornene units in terms of iodine value; intrinsic viscosity [η] in 135° C. decalin: 0.8 dl/g; hereinafter simplified as EPT) were dissolved in 900 g of n-hexane, and stirred until the solution became homogeneous.

Subsequently, as a surfactant, 5 g of potassium oleate were dispersed in 900 g of water, and thereafter mixed into the above solution by use of a homomixer (a stirsphere of $N_2$ according to the following formulation to coagulate the latex with the use of magnesium sulfate, followed by washing with water, dewatering and drying to obtain a thermoplastic polymer for assay.

| Formulation | |
|---|---|
| Compounding components | Parts by weight |
| Crosslinked latex composition (As EPT) | 20 |
| Styrene | 57 |
| Acrylonitrile | 23 |
| n-Dodecyl mercaptan | 0.3 |

-continued

| Formulation | |
|---|---|
| Compounding components | Parts by weight |
| Sodium laurate | 2.5 |
| Cumene hydroperoxide | 0.7 |
| Dextrose | 1.0 |
| Sodium pyrophosphate | 0.5 |
| Ferrous sulfate | 0.01 |
| Water | 180 |

This thermoplastic polymer was injection molded to judge the respective properties of impact resistance, weathering resistance and surface gloss. Results thereof are shown in Table 5.

The measurements were carried out in the following manner:

(3) Impact resistance (Izod impact strength, kg.cm/cm): In accordance with ASTM D256-56.

(4) Weathering resistance (%):
Shown by the retention of Izod impact strength after exposure for 500 hours under the conditions of ASTM D1435, by using an ultraviolet carbon arc weathering meter.

(5) Surface gloss (%):
In accordance with ASTM D523.

EXAMPLE 59

Example 58 was repeated, except that EPT whose intrinsic viscosity $[\eta]$ in 135° C. decalin is 2.2 dl/g was used, to prepare a crosslinked latex composition and a thermoplastic polymer. Profiles of these are shown in Table 5.

EXAMPLE 60

Example 58 was repeated to prepare a crosslinked latex composition and a thermoplastic polymer, except that 15 g of a modified polyethylene wax (density: 0.93 g/cm$^3$; softening point: 111° C.; maleic anhydride content: 3% by weight) was compounded together with EPT and the time for blend with stirring for formation into a latex was made 30 minutes.

Results of these are shown in Table 5.

EXAMPLES 61 to 63

Example 58 was repeated to prepare a crosslinked latex composition and a thermoplastic polymer, except that the amount for compounding the modified polyethylene wax was made 12 g and the intrinsic viscosity of the EPT was varied. Profiles of these are shown in Table 5.

EXAMPLE 64

Example 60 was repeated to prepared a crosslinked latex composition and a thermoplastic polymer, except that the amount for compounding the polyethylene wax was made to be 25 g and the intrinsic viscosity of the EPT was made to be 0.4 dl/g. Profiles of these are shown in Table 5.

TABLE 5

| | Example No. | | | | | | |
|---|---|---|---|---|---|---|---|
| Items: | 58 | 59 | 60 | 61 | 62 | 63 | 64 |
| Crosslinked latex composition: | | | | | | | |
| Intrinsic viscosity $[\eta]$ of EPT in 135° C. decalin (dl/g) | 0.8 | 2.2 | 0.8 | 1.0 | 1.2 | 1.4 | 0.4 |
| Average particle diameter (μm) | 1.0 | 5 | 0.5 | 0.8 | 1.0 | 1.2 | 0.05 |
| Gel percentage (wt. %) | 71 | 71 | 71 | 70 | 73 | 69 | 70 |
| Modified polyethylene wax: | | | | | | | |
| Mixing amount (g/100 g rubber) | — | — | 15 | 12 | 12 | 12 | 25 |
| Maleic anhydride content (wt. %) | — | — | 3 | 3 | 3 | 3 | 3 |
| Irradiation dose (Mrad) | 20 | 20 | 20 | 20 | 20 | 20 | 20 |
| Thermoplastic polymer: | | | | | | | |
| Impact resistance (Izod impact strength) (kg · cm/cm) | 50 | 4.5 | 42 | 51 | 51 | 45 | 9.2 |
| Weathering resistance (%) | 90 | 50 | 95 | 91 | 93 | 94 | 85 |
| Gloss (%) | 70 | 45 | 84 | 78 | 77 | 74 | 65 |

EXAMPLES 65 to 68

Example 62 was repeated, except that the mixing amount of the modified polyethylene wax was made to be 14 g and the irradiation dose at the crosslinking was varied, to prepare crosslinked latex composition and thermoplastic polymers. Profiles of these are shown in Table 6.

EXAMPLES 69 to 70

Example 61 was repeated, except that the irradiation dose at the crosslinking was varied, to prepare crosslinked latex compositions and thermoplastic polymers. Profiles of these are shown in Table 6.

TABLE 6

| | Example No. | | | | | |
|---|---|---|---|---|---|---|
| Items: | 65 | 66 | 67 | 68 | 69 | 70 |
| Crosslinked latex composition: | | | | | | |
| Intrinsic viscosity $[\eta]$ of EPT in 135° C. decalin (dl/g) | 1.2 | 1.2 | 1.2 | 1.2 | 1.0 | 1.0 |
| Average particle diameter (μm) | 0.8 | 0.8 | 0.8 | 0.8 | 0.8 | 0.8 |
| Gel percentage (wt. %) | 41 | 64 | 81 | 90 | 21 | 96 |
| Modified polyethylene wax: | | | | | | |
| Mixing amount (g/100 g rubber) | 14 | 14 | 14 | 14 | 12 | 12 |
| Maleic anhydride content (wt. %) | 3 | 3 | 3 | 3 | 3 | 3 |
| Irradiation dose (Mrad) | 10 | 15 | 40 | 80 | 5 | 100 |
| Thermoplastic polymer: | | | | | | |
| Impact resistance (Izod impact strength) (kg · cm/cm) | 40 | 45 | 50 | 51 | 8.5 | 9.5 |
| Weathering resistance (%) | 90 | 91 | 93 | 95 | 89 | 87 |
| Gloss (%) | 80 | 81 | 85 | 85 | 60 | 77 |

EXAMPLES 71 to 73

Examples 60 was repeated to prepare crosslinked rubber latex compositions and thermoplastic polymers, except that the content of maleic anhydride in the modified polyethylene wax, the mixing amount thereof and the intrinsic viscosity of the EPT were varied. Profiles of these are shown in Table 7.

TABLE 7

| Items: | Example No. 71 | 72 | 73 |
|---|---|---|---|
| Crosslinked latex composition: | | | |
| Intrinsic viscosity [η] of EPT in 135° C. decalin (dl/g) | 0.8 | 1.0 | 0.8 |
| Average particle diameter (μm) | 0.8 | 0.9 | 1.2 |
| Gel percentage (wt. %) | 70 | 71 | 71 |
| Modified polyethylene wax: | | | |
| Mixing amount (g/100 g rubber) | 13 | 15 | 3 |
| Maleic anhydride content (wt. %) | 1 | 15 | 3 |
| Irradiation dose (Mrad) | 20 | 20 | 20 |
| Thermoplastic polymer: | | | |
| Impact resistance (Izod impact strength) (kg · cm/cm) | 56 | 51 | 45 |
| Weathering resistance (%) | 93 | 91 | 90 |
| Gloss (%) | 79 | 77 | 75 |

EXAMPLES 74 to 77

Example 60 was repeated to prepare crosslinked rubber latex compositions and thermoplastic polymers, except that modified ethylene/propylene copolymers containing 72 mole % of ethylene and having an intrinsic viscosity in 135° C. decalin of 0.2 dl/g were used in place of the modified polyethylene wax, and the content of maleic anhydride therein, the mixing amount thereof and the intrinsic viscosity of the EPT were varied. Profiles of these are shown in Table 8.

TABLE 8

| Items: | Example No. 74 | 75 | 76 | 77 |
|---|---|---|---|---|
| Crosslinked latex composition: | | | | |
| Intrinsic viscosity [η] of EPT in 135° C. decalin (dl/g) | 1.2 | 1.0 | 0.9 | 1.0 |
| Average particle diameter (μm) | 0.8 | 1.0 | 0.8 | 0.8 |
| Gel percentage (wt. %) | 70 | 70 | 70 | 71 |
| Modified ethylene/polyethylene copolymer: | | | | |
| Mixing amount (g/100 g rubber) | 12 | 3 | 12 | 12 |
| Maleic anhydride content (wt. %) | 3 | 3 | 1 | 15 |
| Irradiation dose (Mrad) | 20 | 20 | 20 | 20 |
| Thermoplastic polymer: | | | | |
| Impact resistance (Izod impact strength) (kg · cm/cm) | 50 | 49 | 56 | 51 |
| Weathering resistance (%) | 93 | 95 | 92 | 93 |
| Gloss (%) | 80 | 79 | 80 | 81 |

EXAMPLE 78

Example 1 was repeated, except that p-dinvylbenzene and di-t-butyl peroxytrimethylcyclohexane were used in amounts of 0.15 part by weight and 0.07 part by weight, respectively, to obtain a fine particulate crosslinked amorphous copolymer having an average particle diameter of 2μ and a hot toluene insolubles content of 18% by weight. This was compounded into the EPT by the same procedures as in Example 12, and properties thereof were measured. As a result, the shape retention at extrusion molding was 73% and the tensile strength of vulcanized rubber was 130 kg/cm².

What is claimed:

1. A composition consisting of fine particulate crosslinked amorphous copolymer selected from the group consisting of ethylene/α-olefin copolymer and ethylene/α-olefin/polyene copolymer having an average particle diameter of 0.2 to 50 μm and containing hot toluene insolubles of 15% by weight or more.

2. The amorphous copolymer according to claim 1, wherein the content of hot toluene insolubles is 30 to 95% by weight.

3. The amorphous copolymer according to claim 1, wherein the ethylene content in said amorphous ethylene/α-olefin copolymer is 50 to 80 mole %.

4. The amorphous copolymer according to claim 1, wherein the α-olefin constituting said amorphous ethylene/α-olefin copolymer is α-olefin having 3 to 10 carbon atoms.

5. A latex composition containing a polymer component consisting of a cross-linked amorphous ethylene/α-olefin copolymer or a cross-linked amorphous ethylene/α-olefin/polyene copolymer having an average particle diameter of 0.2 to 50 μm and hot toluene insolubles content of 30 to 95% by weight.

* * * * *